US012620850B2

(12) United States Patent
Tassi

(10) Patent No.: US 12,620,850 B2
(45) Date of Patent: May 5, 2026

(54) ROTOR, MANUFACTURING METHOD, SYNCHRONOUS ELECTRIC MACHINE, AND VEHICLE

(71) Applicant: Spin Applicazioni Magnetiche S.r.l., Alta Val Tidone (IT)

(72) Inventor: Alessandro Tassi, Alta Val Tidone (IT)

(73) Assignee: Spin Applicazioni Magnetiche S.r.l., Alta Val Tidone (IT)

( * ) Notice: Subject to any disclaimer, the term of this patent is extended or adjusted under 35 U.S.C. 154(b) by 197 days.

(21) Appl. No.: 18/573,248

(22) PCT Filed: Jun. 21, 2022

(86) PCT No.: PCT/IB2022/055756
§ 371 (c)(1),
(2) Date: Dec. 21, 2023

(87) PCT Pub. No.: WO2022/269490
PCT Pub. Date: Dec. 29, 2022

(65) Prior Publication Data
US 2024/0204592 A1 Jun. 20, 2024

(30) Foreign Application Priority Data
Jun. 24, 2021 (IT) ........................ 102021000016667

(51) Int. Cl.
*H02K 1/24* (2006.01)
*H02K 1/02* (2006.01)
(Continued)

(52) U.S. Cl.
CPC ................. *H02K 1/24* (2013.01); *H02K 1/02* (2013.01); *H02K 15/022* (2013.01); *H02K 15/12* (2013.01)

(58) Field of Classification Search
CPC ............ H02K 1/24; H02K 1/246; H02K 1/02; H02K 15/022
See application file for complete search history.

(56) References Cited

U.S. PATENT DOCUMENTS 6,239,526 B1 * 5/2001 Oh .......................... H02K 1/246
310/216.107
2015/0372546 A1 * 12/2015 Büttner .................. H02K 15/02
29/598

(Continued)

FOREIGN PATENT DOCUMENTS

DE 102016214542 A1 * 2/2018 ............. H02K 1/246
WO 2017/021078 A1 2/2017

OTHER PUBLICATIONS

DE-102016214542-A1 Machine Translation (Year: 2018).*
(Continued)

*Primary Examiner* — Oluseye Iwarere
*Assistant Examiner* — Masoud Vaziri
(74) *Attorney, Agent, or Firm* — Blank Rome

(57) ABSTRACT

A rotor (1) with N poles, wherein N is an even integer, wherein said rotor (1) is devoid of permanent magnets comprising rare earth elements and comprises a cylindrical body (2) and a filling material (16). The cylindrical body (2) extends along a body axis (X) and—in a plane perpendicular to the body axis (X)—delimits N adjacent angular sectors (4, 6). Each angular sector (4, 6) delimits cylindrical cavities (8, 12, 14, 8', 12', 14') which have curvilinear cross-sections, where concave surfaces (18, 20, 22, 18', 20', 22') of said cylindrical cavities (8, 12, 14, 8', 12', 14') are directed in the opposite direction to the body axis (X). The filling material (16) fills at least partly the cylindrical cavities (8, 12, 14, 8', 12', 14') and comprises or consists of a polymer matrix. At least one angular sector (6) delimits cylindrical cavities (8', 12', 14') with a first geometry (type A) and at least one (Continued)

second angular sector (4) delimits cylindrical cavities (8, 12, 14) with a second geometry (type B) different from said first geometry. The first angular sector (6) is arranged angularly alternating with the second angular sector (4).

8 Claims, 10 Drawing Sheets

(51) Int. Cl.
  *H02K 15/022* (2025.01)
  *H02K 15/12* (2006.01)

(56) References Cited

U.S. PATENT DOCUMENTS

2018/0233971 A1* 8/2018 Kolehmainen ........ H02K 19/14
2019/0207490 A1* 7/2019 Ghoul ................... H02K 15/03

2019/0245394 A1* 8/2019 Takeuchi .............. F04D 29/007
2022/0109335 A1* 4/2022 Volbers ................. H02K 1/148
2023/0208222 A1* 6/2023 Karuzic ................ H02K 15/03
                                        310/216.107

OTHER PUBLICATIONS

International Search Report dated Oct. 5, 2022 issued in connection with PCT/IB2022/055756.
Written Opinion dated Oct. 5, 2022 issued in connection with PCT/IB2022/055756.
International Preliminary Report on Patentability dated Aug. 10, 2023 issued in connection with PCT/IB2022/055756.

* cited by examiner

ROTOR, MANUFACTURING METHOD, SYNCHRONOUS ELECTRIC MACHINE, AND VEHICLE

CROSS-REFERENCE TO RELATED APPLICATIONS

This application is a national phase of PCT/IB2022/055756, filed Jun. 21, 2022, and claims priority to Italian Patent Application No. 102021000016667, filed Jun. 24, 2021, the entire contents of both of which are hereby incorporated by reference.

FIELD OF THE INVENTION

The present invention relates to a rotor comprising a cylindrical body and a filling material.

The present invention also relates to a method for manufacturing a rotor or a rotor module.

The present invention also relates to a synchronous electric machine comprising said rotor, or a rotor obtained using said manufacturing method.

The present invention also relates to an electric or hybrid vehicle comprising said synchronous electric machine.

PRIOR ART

Reluctance motors are motors which technologically date back to almost a century ago. In particular, "Kostko" polyphase synchronous reaction motors date back to 1923. Reluctance motors are characterized by a rotor structure which does not have windings and is magnetically anisotropic.

Reluctance motors are machines with technological limitations which, hitherto, have not favoured their large-scale use.

One technological limitation consists in a relatively low power factor due to a phase-displacement angle between voltage and current: an "active" current amount may produce a useful mechanical force, while another current amount—which is phase-displaced by 90° with respect to the voltage—is "reactive" so that, although managing to excite the rotor, it does not produce any useful effect.

Another technological limitation consists in the torque ripple (vibration) which is generated by the air chambers of the rotor and which results in noisiness and resonance.

The documents US 2015/0372546 A1, US 2019/207490 A1 and WO 2017/021078 A1 illustrate rotors for reluctance motors according to the prior art.

SUMMARY OF THE INVENTION

The Applicant, after long and intense research and development activity and in the firm conviction that reluctance motors will be of increasingly greater interest in the coming years (for example, but not exclusively, in the electric mobility sector), has developed a rotor, a manufacturing method, a synchronous electric machine and a vehicle which are able to provide a suitable response to the limitations, drawbacks and existing problems.

In fact, the Applicant has surprisingly found that—by introducing asymmetries into the cavities of the rotor—it is possible to reduce the torque ripple (and therefore the noisiness and resonance) of the rotor and increase the mean value of the torque of the machine which comprises said rotor.

Therefore, the present invention relates to a rotor comprising a cylindrical body and a filling material, having the features as defined in the attached claims.

The present invention also relates to a method for manufacturing a rotor or a rotor module, having the features as defined in the attached claims.

The present invention also relates to a synchronous electric machine comprising said rotor, or a rotor obtained using said manufacturing method, having the features as defined in the attached claims.

The present invention also relates to an electric or hybrid vehicle comprising said synchronous electric machine, having the features as defined in the attached claims.

DESCRIPTION OF THE FIGURES

The preferred embodiments of the present invention will be described hereinbelow by way of a non-limiting example with reference to the drawings wherein.

DETAILED DESCRIPTION

Figures 1, 2:
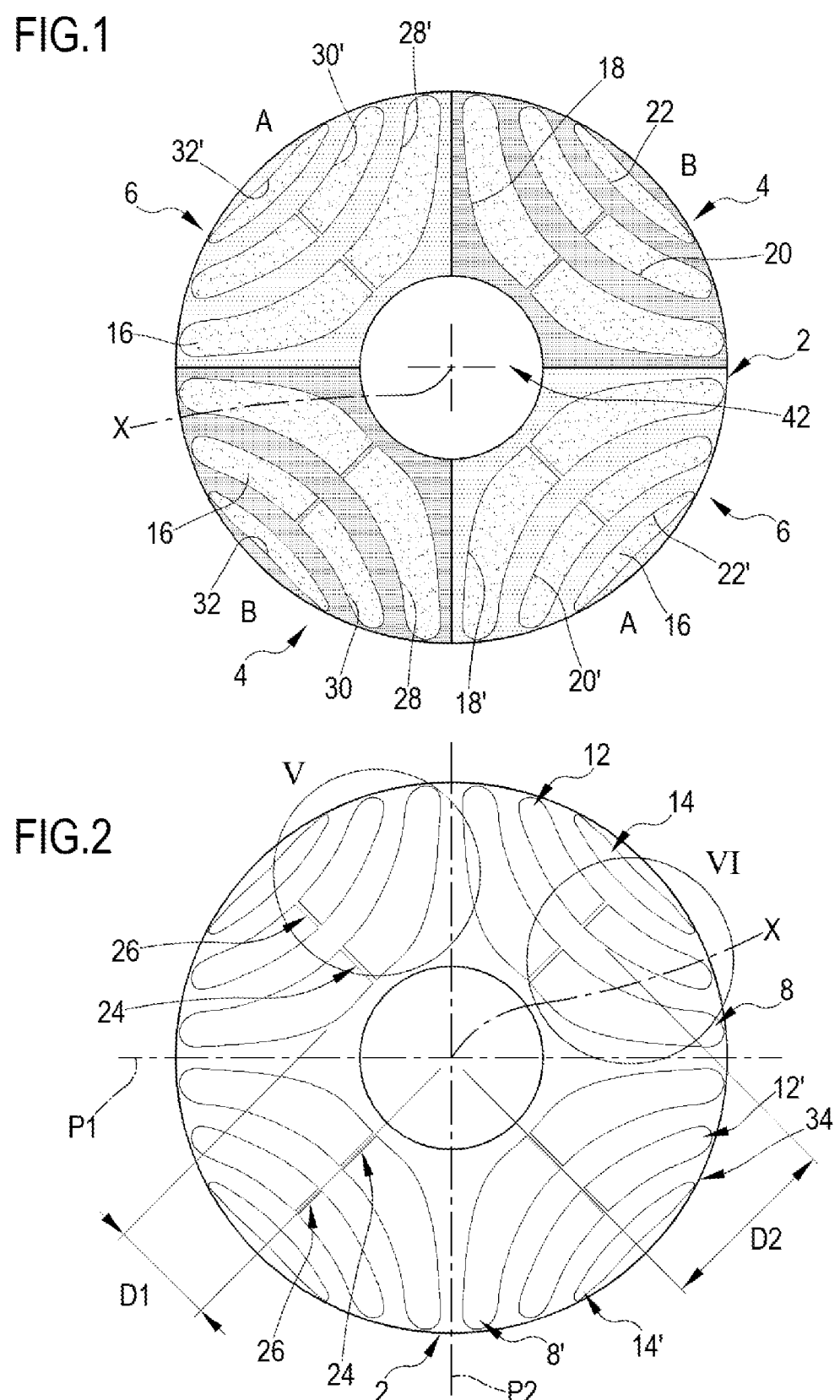
FIGS. 1 and 2 shows plan views of a rotor and a cylindrical body, respectively, according to possible embodiments of the present invention.
Figure 3:
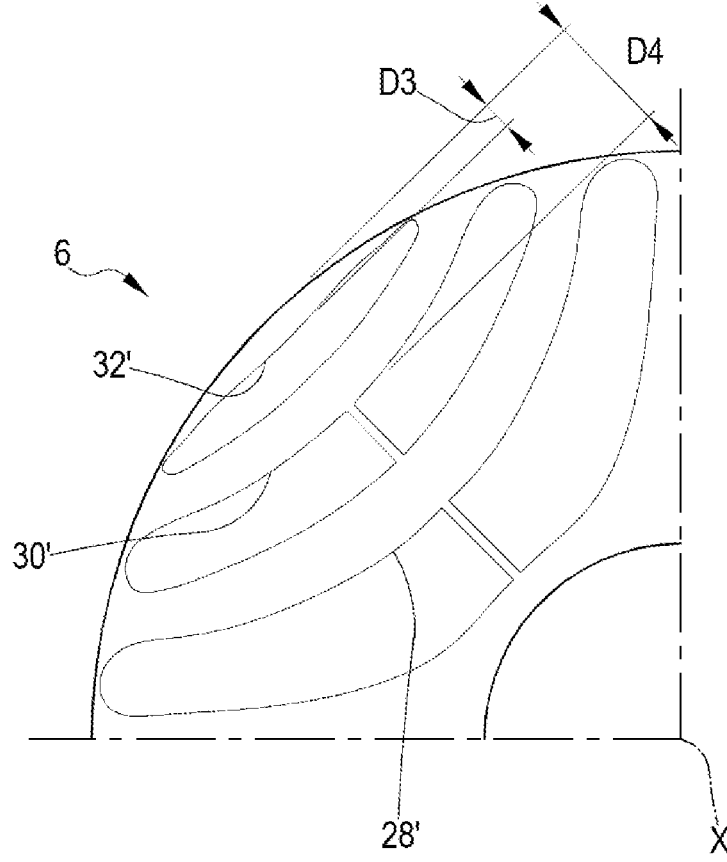
FIGS. 3 and 4 show a detail, on larger scale, of a first angular sector and a second angular sector, respectively, in accordance with possible embodiments.
Figure 4:
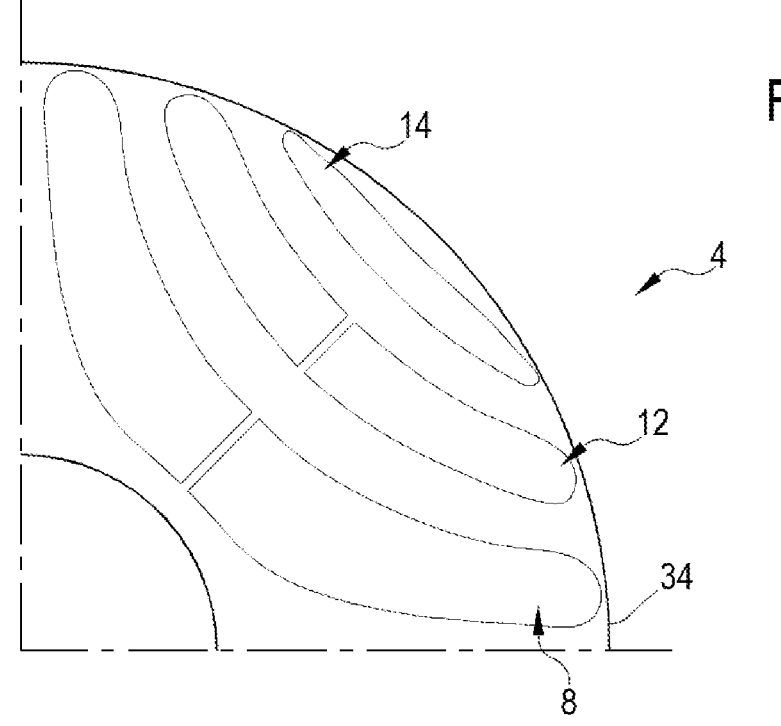

With reference to the attached drawings, the reference number 1 denotes, overall, a rotor 1 having N poles, without permanent magnets comprising rare earth elements (for example without neodymium and/or without samarium), comprising a cylindrical body 2 and a filling material 16.

N is an even integer, preferably, 2, 4, 6, 8, 10 or 12, more preferably N=2, N=4 or N=6. Even more preferably, N=4 or N=6.

The cylindrical body 2 extends along a body axis X (or height of the cylindrical body) between a first cylinder base 60 and an opposite cylinder base 62 and—in a plane perpendicular to the body axis X—said cylindrical body 2 delimits N adjacent angular sectors 4, 6 (where the number of angular sectors is equal to the number of poles N).

Preferably the cylindrical body 2 is delimited or circumscribed by an outer cylindrical surface 34.

In the present description the expressions "axial", "radial", "angular", "circumferential", "proximal", "distal", "orthogonal" will be always used with reference to the body axis X, unless otherwise specified.

The cylindrical body 2 is preferably crossed (from side to side) by an axial hole 42. Preferably, the axial hole 42 has a substantially circular orthogonal cross-section, which is optionally suitably shaped so that it may be connected together with a transmission shaft 44 (for example shown in FIG. 9). Preferably said connection between cylindrical body 2 and transmission shaft 44 is a prismatic (or anti-rotation) connection or coupling such that said cylindrical body 2 and said transmission shaft 44 are rotationally integral.

The cylindrical body 2 has preferably an outer diameter (or diameter of the base of the cylindrical body) comprised from 50 mm to 200 mm, more preferably comprised from 60 mm to 150 mm, even more preferably comprised from 80 mm to 100 mm, still more preferably comprised from 85 mm to 95 mm.

Where an axial hole 42 is present, the cylindrical body 2 has preferably an inner diameter comprised from 20 mm to 150 mm, preferably comprised from 25 mm to 100 mm, even more preferably comprised from 30 mm to 50 mm.

The cylindrical body 2 is preferably made of a metal alloy, preferably iron alloy, more preferably an iron-silicon alloy. Even more preferably, said alloy is an M400-50A or M330-35 alloy. The abbreviations M400 or M330-35A refer to the standard EN 10106:2015, where the first three digits indicate units, tenths and one hundredths of the value of the losses in the iron specific for a kilogram of material under standard frequency and magnetic induction conditions, while the last two digits of each abbreviation indicate a lamination thickness of said alloy expressed in hundredths of a millimetre.

It is pointed out that this standard, like all the standards mentioned in the present description, are considered as being the version which is valid at the priority date of this patent application.

Preferably, the cylindrical body 2 consists of a plurality of cylinder plates superimposed in the axial direction and joined together. For example, the cylinder plates are joined together by means of a form-fitting and/or force-fitting connection, by means of welds, and/or by means of cohesion forces exerted by the filling material 16. The lamination thickness mentioned above refers to the thickness of the cylinder plates formed by the metal alloy.

The cylinder plates are superimposed in the axial direction and joined together preferably so that the polarities (positive and negative) of each of the N poles of a cylinder plate correspond axially to the polarities (positive and negative) of the N poles of an adjacent cylinder plate. In other words, the polarities of a cylinder plate are not phase-displaced—for example by 90°—with respect to the polarities of an adjacent cylinder plate.

Preferably, each cylinder plate has a thickness (in the axial direction) comprised from 0.1 mm to 1 mm, preferably comprised from 0.2 mm to 0.8 mm, more preferably comprised from 0.3 mm to 0.6 mm, even more preferably comprised from 0.35 mm to 0.5 mm.

By way of example, the cylindrical body 2 consists of a number of cylinder plates comprised from 10 to 500, preferably comprised from 20 to 400, even more preferably comprised from 50 to 300.

The angular sectors are divided from each other by one or more separation planes P(i). Said at least one separation plane P(i) includes the body axis X.

By way of example, FIG. 2 shows a rotor with two separation planes P1, P2 which separate four angular sectors 4, 6, where said separation planes P1, P2 intersect each other along the body axis X. The planes P1, P2 are preferably arranged at 90° relative to each other, so that said sectors 4, 6 all have the same angular development.

Figure 14:
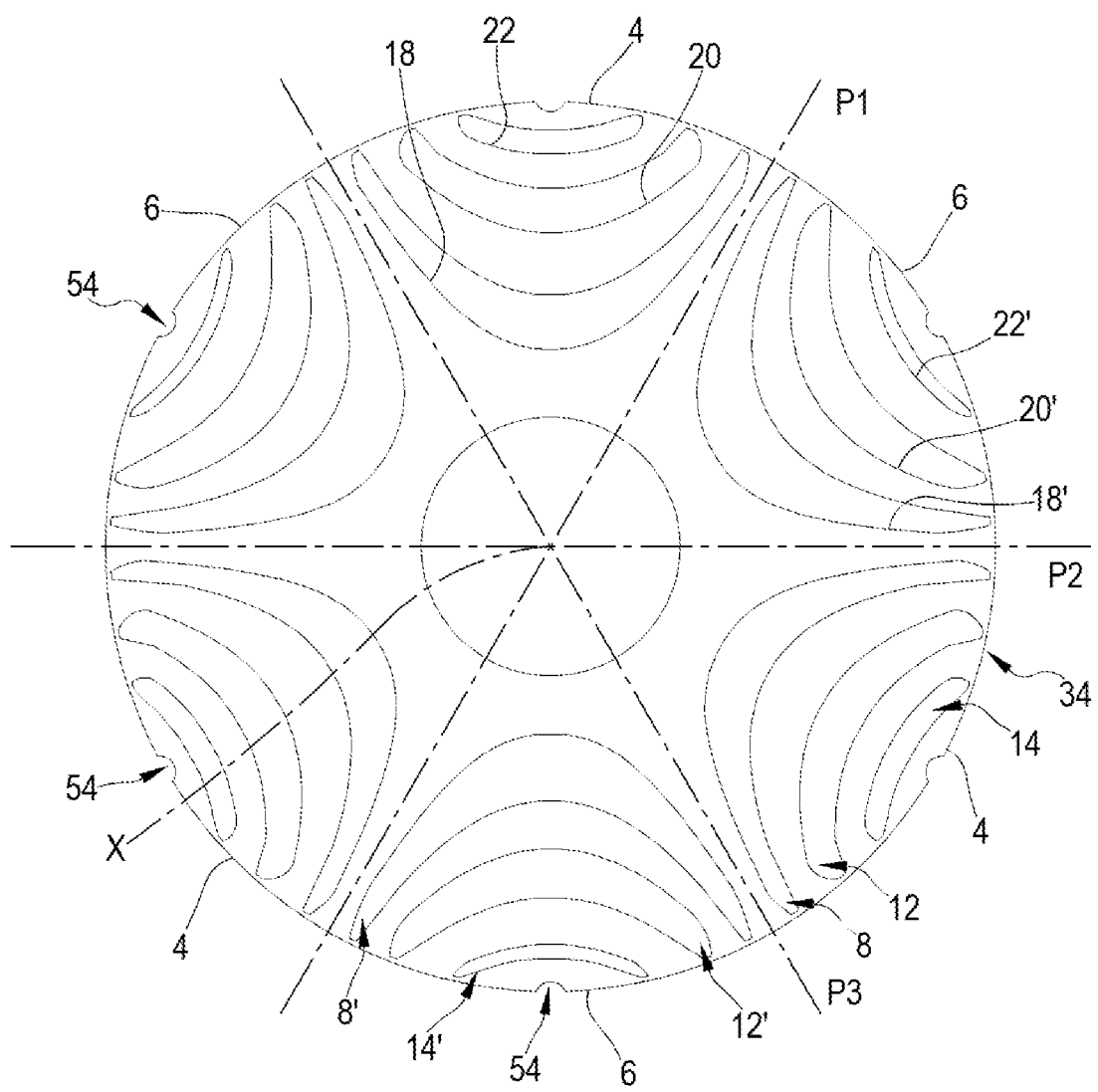
FIG. 14 shows a plan view of a cylindrical body according to another possible embodiment of the present invention.

By way of a further example, FIG. 14 shows a rotor with three separation planes P1, P2, P3 which separate six angular sectors 4, 6, where said separation planes P1, P2, P3 intersect each other along the body axis X. The planes P1, P2, P3 are preferably arranged at 60° relative to each other, so that said sectors 4, 6 all have the same angular development.

For a rotor with N poles, the planes P(i) are preferably arranged relative to each other at angles such that the angular sectors all have the same angular development.

Preferably, each of said N poles extends axially along the body axis X from the first cylinder base 60 to the second cylinder base 62 of the cylinder body 2.

Each angular sector 4, 6 delimits axial cavities 8, 12, 14, 8', 12', 14', preferably cylindrical cavities 8, 12, 14, 8', 12', 14' which have curvilinear or inwardly curved cross-sections. Concave surfaces 18, 20, 22, 18', 20', 22' of said axial or cylindrical cavities 8, 12, 14, 8', 12', 14' are directed in a direction opposite to the body axis X.

In this description, the expression "cylindrical" means that the aforementioned cavities are delimited by cylindrical surfaces and that said cavities therefore have a constant cross-section. The same meaning shall also be given to the recesses 54 described below.

Preferably, the axial cavities or cylindrical cavities 8, 12, 14, 8', 12', 14' are delimited also by convex surfaces 28, 30, 32, 28', 30', 32' situated in front of the concave surfaces 18, 20, 22, 18', 20', 22' and facing the body axis X.

Preferably, the axial cavities or cylindrical cavities 8, 12, 14, 8', 12', 14' are tapered radially outwardly.

Preferably, at least one of the cylindrical cavities 8, 12, 14, 8', 12', 14' is crossed by a radial mid-plane M.

Preferably, the separation planes P(i) divide the angular sectors without crossing the axial cavities or cylindrical cavities, accommodating only the bulk of the rotor and the axial hole 42 (where provided).

The filling material 16 occupies (or fills) at least partly (preferably completely or substantially completely) said axial cavities or cylindrical cavities 8, 12, 14, 8', 12', 14'.

In accordance with a first embodiment, the filling material 16 comprises or consists of a polymer matrix which incorporates one or more magnetizable or magnetized fillers.

In accordance with a second embodiment, the filling material 16 comprises or consists of a polymer matrix, where said matrix is preferably devoid of one or more magnetizable or magnetized fillers embedded within said polymer matrix.

The presence of the filling material 16 inside the axial cavities or cylindrical cavities 8, 12, 14, 8', 12', 14' significantly benefits the power factor of the synchronous electric machine, which is unexpectedly higher than a corresponding synchronous electric machine where—all other conditions being equal—the axial or cylindrical cavities are empty and therefore occupied by air, in particular in embodiments where the polymer matrix incorporates one or more magnetizable or magnetized fillers.

This benefit is present despite the fact that said filling material forms a magnet which is weaker than permanent magnets comprising rare earths. This is due to the capacity of the filling material to "re-phase" the synchronous electric machine, namely reduce at least partially the phase-displacement angle between voltage and current.

Preferably the quantity of said one or more magnetizable fillers in said filling material 16 is preferably comprised from 50% to 98% by weight of the total weight of said filling material, preferably comprised from 60% to 96% by weight, more preferably comprised from 65% to 95% by weight, and even more preferably comprised from 75% to 94% by weight.

Preferably, the filling material 16 has:

a residual flux density or remanence (Br)—determined in accordance with DIN 60404-5—comprised from 150 mT to 450 mT, preferably comprised from 180 mT to 380 mT, more preferably comprised from 220 mT to 320 mT, and even more preferably comprised from 250 mT to 310 mT; and/or a coercive field intensity or coercivity (jHc)—determined in accordance with DIN EN 60404-5—comprised from 130 kA/m to 350 kA/m, preferably comprised from 150 kA/m to 320 kA/m, more preferably comprised from 170 kA/m to 280 kA/m, and even more preferably comprised from 190 kA/m to 250 kA/m; and/or a maximum energy product (BH max)—determined in accordance with DIN EN 60404-5—comprised from 10 $kJ/m^3$ to 20 $kJ/m^3$, preferably comprised from 12 $kJ/m^3$ to 18.5 $kJ/m^3$, more preferably comprised from 13 $kJ/m^3$ to 16 $kJ/m^3$, and even more preferably comprised from 14 $kJ/m^3$ to 15.8 $kJ/m^3$.

A filling material density 16—determined in accordance with ISO 1183—is preferably comprised from 3000.00 $kg/m^3$ to 4000.00 $kg/m^3$, more preferably comprised from 3500.00 $kg/m^3$ to 3700.00 $kg/m^3$, and even more preferably comprised from 3550.00 $kg/m^3$ to 3650.00 $kg/m^3$.

Preferably, the filling material 16 has one or both the following rheological properties:

a shrinkage in the flow direction—determined in accordance with ISO 294-4—comprised from 0.2% to 2%, preferably comprised from 0.6% to 1.5%, more preferably comprised from 0.7% to 1%, and even more preferably equal to 0.8%; and/or a shrinkage in a direction transverse to the flow direction—determined in accordance with ISO 294-4—comprised from 0.2% to 2%, preferably comprised from 0.5% to 1%, more preferably comprised from 0.45% to 0.8%, and even more preferably equal to 0.5%.

The polymer matrix of the filling material of 16 is preferably a thermoplastic matrix or a thermosetting matrix.

The thermoplastic polymer matrix is preferably selected from the group comprising or, alternatively, consisting of polyamide (PA), polyamide 6 (PA6), polyamide 6.6 (PA6.6), polyamide 12 (PA12), polyphenylene sulphide (PPS), liquid crystal polymer (LCP). More preferably, said polymer matrix is PA, PA6 or PPS, even more preferably said polymer matrix is PA6 or PPS.

The thermosetting polymer matrix is preferably selected from the group which comprises or, alternatively, consists of: polyester resins, vinyl ester resins, phenol resins, epoxy resins, more preferably polyester resins or epoxy resins.

The at least one magnetizable filler Is preferably selected from magnetite, ferrite and mixtures thereof. More preferably, said magnetizable filler is ferrite.

Said ferrite preferably comprises one or more metallic elements selected from the group which comprises or, alternatively, consists of: strontium, barium, manganese, nickel, zinc and mixtures thereof; more preferably said ferrite comprises strontium or comprises exclusively strontium as metallic element.

Preferably, said polymer matrix is PA6 or PPS and said magnetizable filler is ferrite comprising exclusively strontium as metallic element.

By the way of a non-limiting example, said filling material 16 is the product, code "KEBABLEND/M 14/22 PA6" marketed by BARLOG Plastics GmbH (51491 Overath, Germany).

At least one first angular sector 6 delimits axial or cylindrical cavities 8', 12', 14' with a first geometry (type A geometry) and at least one second angular sector 4 delimits axial or cylindrical cavities 8, 12, 14 with a second geometry (type B geometry). different from said first geometry, the first angular sector 6 angularly alternating with said second angular sector 4.

Therefore, according to an innovative aspect of the present invention, by means of said geometric asymmetry of the axial or cylindrical cavities of the rotor (and therefore of the angular sectors) and by means of said angularly alternating arrangement of sectors with a different geometry, the rotor according to the invention has made it possible to reduce the torque ripple (and therefore noisiness and resonance) and increase the mean value of the torque of the synchronous electric machine.

Figures 7A, 7B, 8:
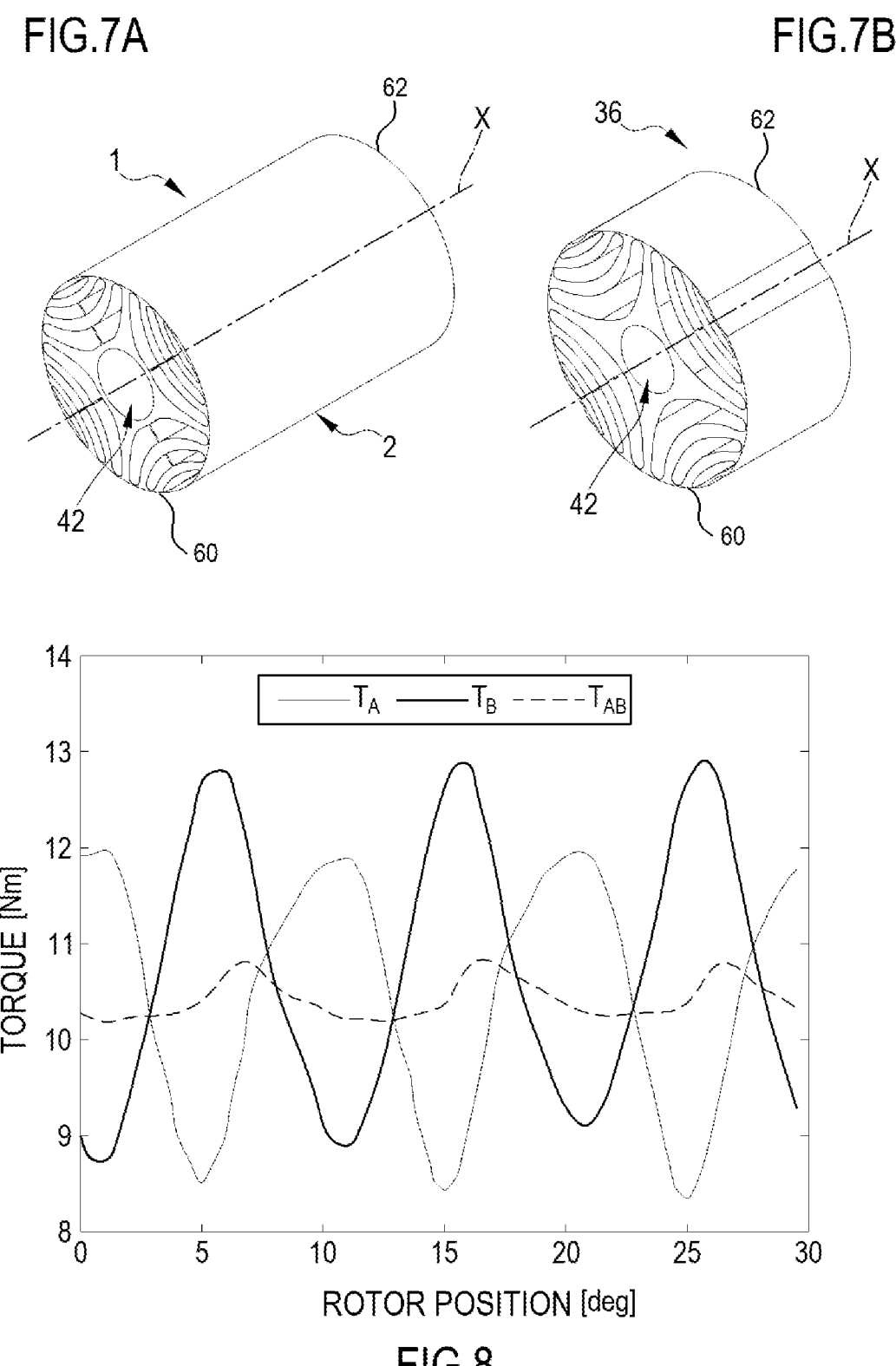
FIGS. 7A and 7B show perspective views, respectively, of a cylindrical body and a modular element, in accordance with possible embodiments.
FIG. 8 shows a torque/position diagram of the rotor comparing the torque ripple and the mean torque of an asymmetrical rotor according to the present invention and rotors with symmetrical axial cavities according to the prior art.

With particular reference to the graph shown in FIG. 8, said graph shows torque values as a function of the angular position of different rotors tested. In said graph:

the broken line $T_{AB}$ represents the torque ripple of a possible embodiment of the rotor according to the invention (with an alternating arrangement of geometries A-B-A-B, as for example shown in FIGS. 1 and 2);

the curve $T_A$—which at 0° has a torque of about 12 Nm—shows the torque ripple of a first rotor of the prior art in which only angular sectors of the type A (A-A-A-A) are present;

the curve $T_B$—which at 0° has a torque of about 9 Nm—shows the torque ripple of a second rotor of the prior art in which only angular sectors of the type B (B-B-B-B) are present.

From FIG. 8 it can be seen that the rotor according to the present invention has a smaller ripple, in particular characterized by a smaller amplitude at 1 Nm and by a longer period, compared to the other two rotors tested.

Similar tests were carried out on rotors with a number of poles N different from four. The outcomes of these tests are comparable with the progression shown in FIG. 8.

One or more cylindrical cavities 8, 12, 14, 8', 12', 14' are preferably separated from the outer cylindrical surface 34 by means of one or more dividing walls 56, each of which has preferably a variable thickness in a circumferential direction of the cylindrical body 2 and a minimum thickness point 58.

More preferably, the dividing wall 56 is arranged between the radially outer end of a cylindrical cavity 8, 12, 14, 8', 12', 14' and the outer cylindrical surface 34.

The minimum thickness point 58 is preferably determined by the radially outward tapering of one or more axial cavities or cylindrical cavities 8, 12, 14, 8', 12', 14'. By way of example, one or more axial cavities or cylindrical cavities 8, 12, 14, 8', 12', 14' terminate with generally rounded ends (having respective cavities directed towards the body axis X) which delimit the point of minimum thickness 58 with the outer cylindrical surface 34.

Figure 5:
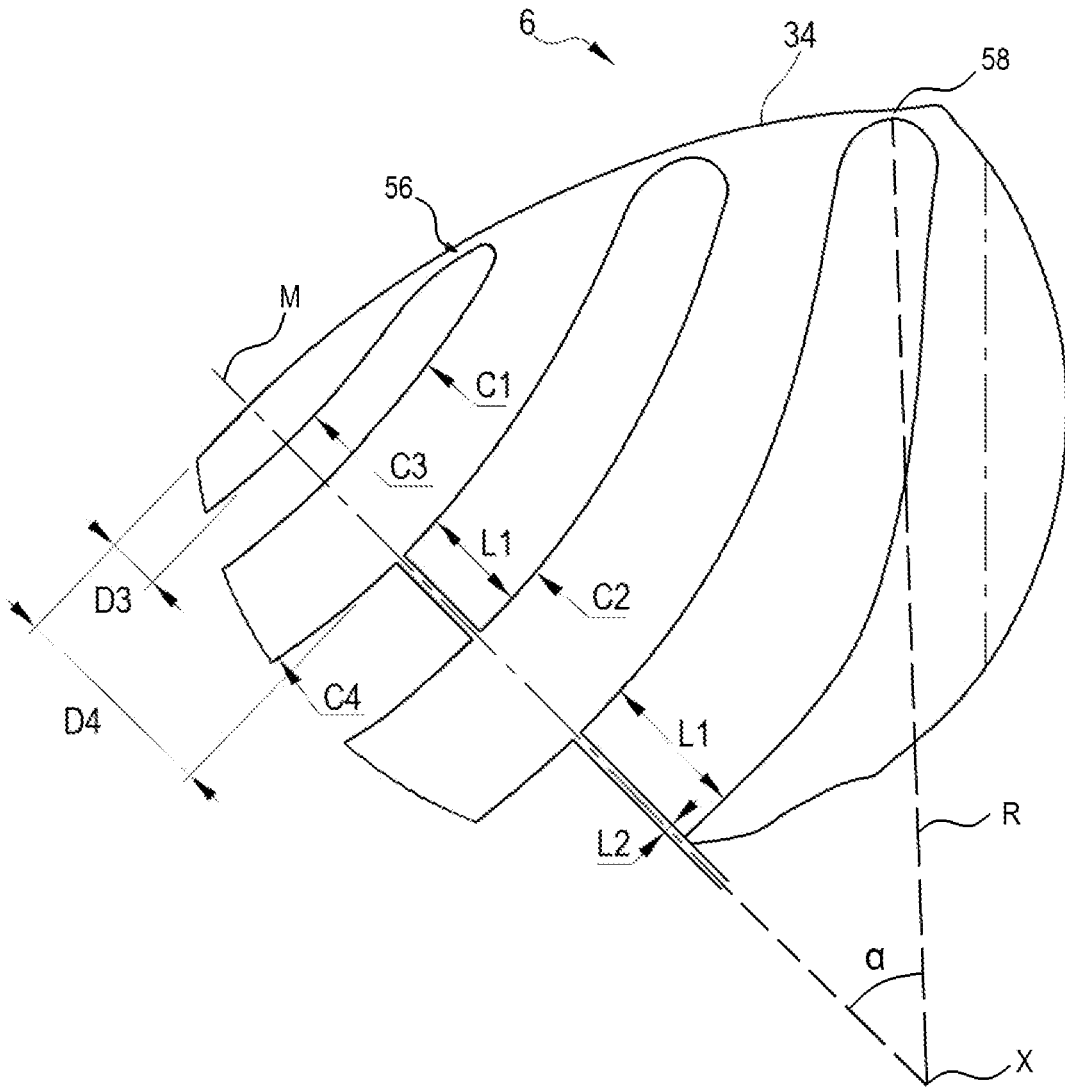
FIGS. 5 and 6 show a detail, on a larger scale, of the zones V and VI highlighted in FIG. 2, in accordance with further possible embodiments.
Figure 6:
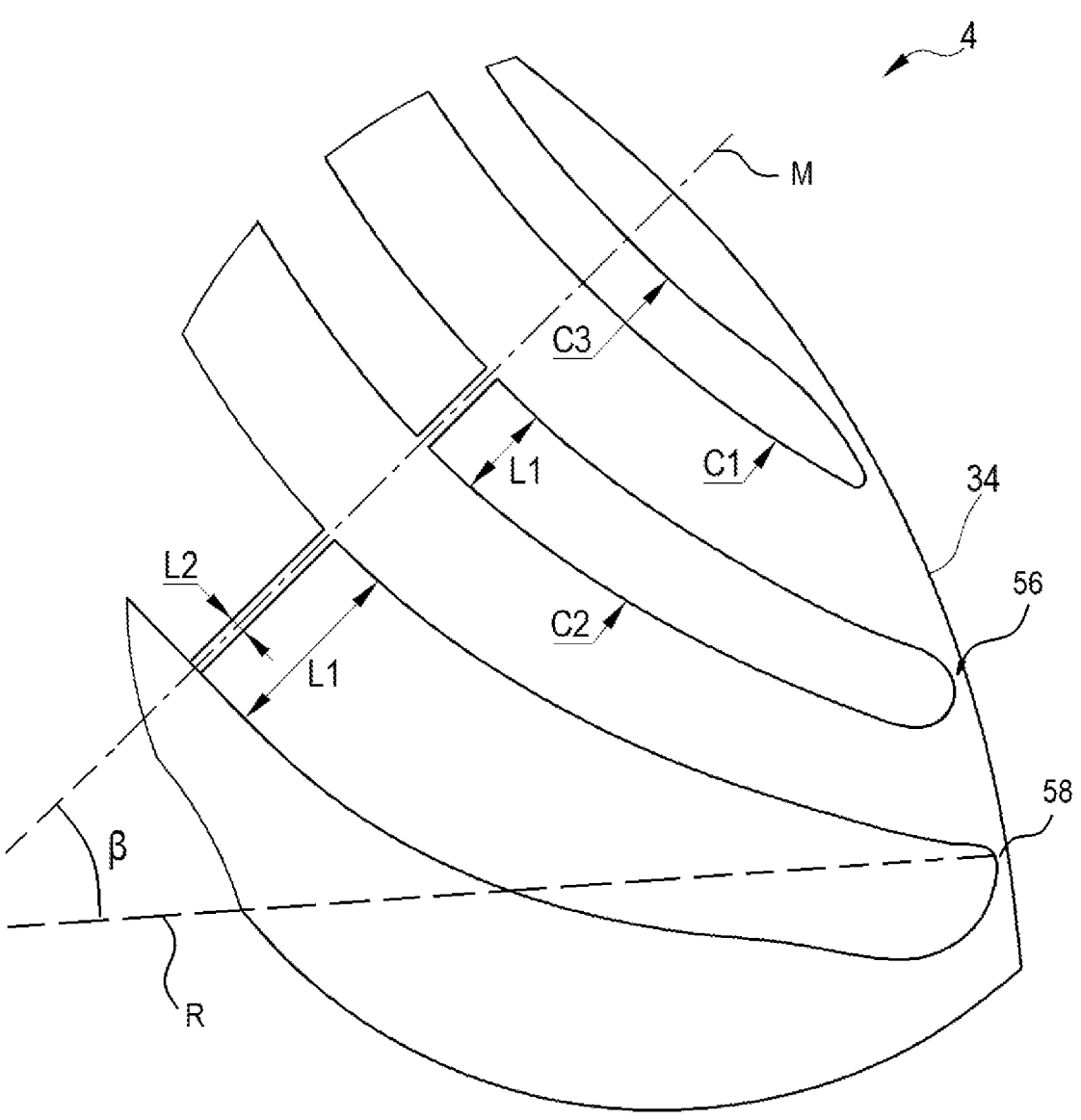

The variable thickness of the dividing walls 56 is preferably present in all the cylindrical cavities 8, 12, 14, 8', 12', 14', although this characteristic is less evident in the distal axial or cylindrical cavities 14, 14', schematically shown in FIGS. 5 and 6.

A radial plane R includes the body axis X and the minimum thickness point 58 of a dividing wall 56. This radial plane R circumscribes an angle α, β with the afore-mentioned mid-plane M.

According to this embodiment, at least one cylindrical cavity 8', 12', 14' delimited by the first angular sector 6 preferably is characterized by a first angle α, and at least a corresponding cylindrical cavity 8, 12, 14 delimited by the second angular sector 4 preferably is characterized by a second angle β different from said first angle α.

The expression "corresponding" cylindrical cavity is understood as meaning that, as for example schematically shown in FIGS. 5 and 6, the angles α, β must be considered between cylindrical cavities having radial arrangements and forms which are similar in the first angular sector 6 and in the second angular sector 4, in particular comparing the angles α, β between analogous proximal axial or cylindrical cavities 8, 8', intermediate axial or cylindrical cavities 12, 12' and/or distal axial or cylindrical cavities 14, 14'.

According to embodiments, the difference between the aforementioned angles α, β preferably determines the first geometry (type A) or the second geometry (type B) of the axial or cylindrical cavities and of the respective sector.

Preferably, each axial or cylindrical cavity 8, 12, 14, 8', 12', 14' circumscribes an internal volume, is delimited by an outer perimeter and has a specific radial arrangement inside its angular sector 4, 6, where said internal volume, said outer perimeter and said specific radial arrangement determine the geometry (type A or type B) of the axial or cylindrical cavities and therefore of the respective sector. The axial or cylindrical cavities 8', 12', 14' delimited by the first angular sector 6 therefore have internal volumes, forms and/or lengths of the outer perimeters and/or specific radial arrangements different from those of the axial or cylindrical cavities 8, 12, 14 delimited by the second angular sector 4.

More preferably, the axial or cylindrical cavities 8, 12, 14, 8', 12', 14' comprise a proximal axial or cylindrical cavity 8, 8', at least one intermediate axial or cylindrical cavity 12, 12' (namely only one or a plurality of intermediate axial or cylindrical cavities) and a distal axial or cylindrical cavity 14, 14' which are spaced in a radial direction from the body axis X.

In each sector 4, 6, the proximal axial or cylindrical cavity 8, 8' and the at least one intermediate axial or cylindrical cavity 12, 12' preferably have a mirror-image symmetry with respect to radial bridges 24, 26 which centrally divide said proximal axial or cylindrical cavity 8, 8' and said at least one intermediate axial or cylindrical cavity 12, 12'.

The presence of radial bridges 24, 26 becomes an important characteristic when the axial or cylindrical cavities have large internal volumes. More specifically, since each cavity constitutes a structural weakening of the rotor, the presence of at least one radial bridge 24, 26 ensures the structural integrity of the rotating rotor, despite the significant centrifugal forces acting on said rotor.

In accordance with other embodiments (not shown):
   the proximal axial or cylindrical cavity 8, 8' and the at least one intermediate axial or cylindrical cavity 12, 12' do not have radial bridges; or
   each sector 4, 6 comprises one or more radial bridges 24, 26 which divide or pass through the proximal axial or cylindrical cavity 8, 8', the at least one intermediate axial or cylindrical cavity 12, 12', and/or the distal axial or cylindrical cavity 14, 14'; preferably said one or more radial bridges 24, 26 divide(s) said axial or cylindrical cavities asymmetrically.

Preferably, each radial bridge 24, 26 has an average thickness (in a direction perpendicular to the radial direction) of comprised from 0.1 mm to 2 mm, preferably comprised from 0.2 mm to 1 mm, and even more preferably comprised from 0.3 mm to 0.7 mm.

Preferably, the axial or cylindrical cavities 8', 12', 14' delimited by the first angular sector 6 have different:
   (i) radial distances D1, D2 of the proximal axial or cylindrical cavities 8, 8' and/or of the at least one intermediate axial or cylindrical cavity 12, 12' from the body axis X; and/or
   (ii) radial distances D3, D4 of the convex surfaces 28, 30, 32, 28', 30', 32' of said axial or cylindrical cavities 8, 12, 14, 8', 12', 14' with respect to the outer cylindrical surface or circumference 34 of said rotor 1; and/or
   (iii) lengths L1 and/or widths L2 of the radial bridges 24, 26; and/or (iv) radii of curvature C1, C2 of one or more concave surfaces 18, 20, 22, 18', 20', 22' or of a part of said concave surfaces; and/or
   (iv) radii of curvature C3, C4 of one or more convex surfaces 28, 30, 32, 28', 30', 32', or of a part of said convex surfaces; and/or
   (iv) optionally length, alternating arrangement and/or incidence of any straight sections T1, T2 located along one or more concave surfaces 18, 20, 22, 18', 20', 22';
   compared to the axial or cylindrical cavities 8, 12, 14 delimited by the second angular sector 4.

According to this embodiment, one or more of the characteristics (i)-(v), optionally (i)-(vi), determine the geometry (type A or B) of the axial or cylindrical cavities and of the respective sector.

Figure 15:
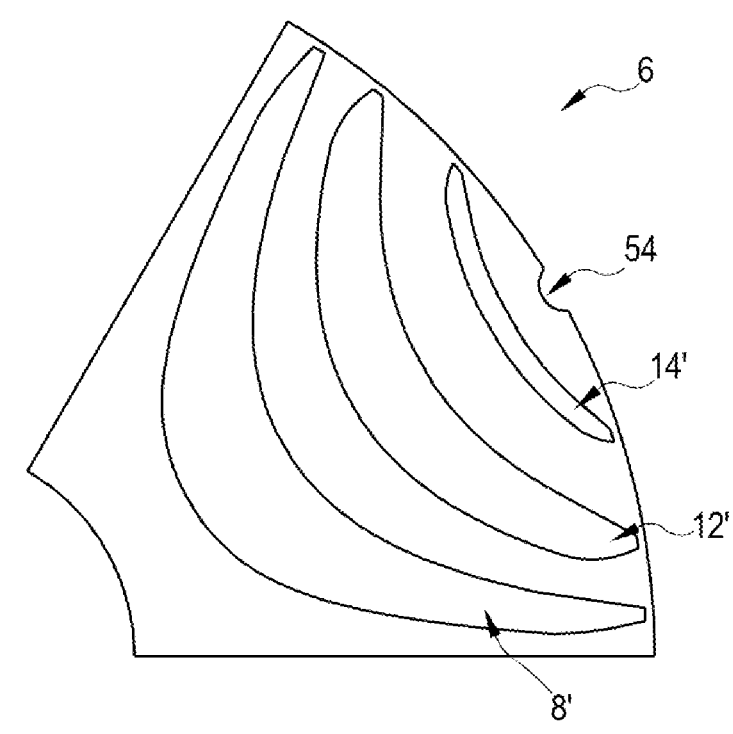
FIGS. 15 and 16 show a detail, on larger scale, of a first angular sector and a second angular sector, respectively, in accordance with the embodiment of FIG. 14.
Figure 16:
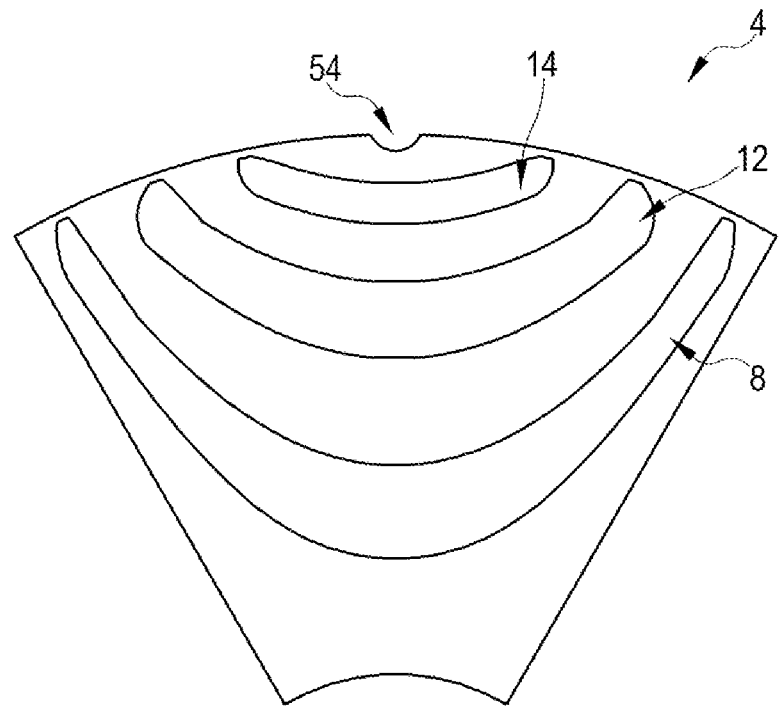

Preferably, the rotor 1 is delimited or circumscribed by the outer cylindrical surface or circumference 34. This outer cylindrical surface 34 comprises preferably a plurality of cylindrical or axial recesses 54 which extend from said cylindrical surface 34 towards the inside of the cylindrical body 2. Preferably, each axial or cylindrical recess 54 is delimited by a concave surface (preferably in the form of a circle arc or ellipse arc, preferably with a constant cross-section along the body axis X) directed in the opposite direction to the body axis X. For example, see the embodiment in FIGS. 14-16.

Preferably, each angular sector 4, 6 comprises at least one axial or cylindrical recess 54, more preferably a single axial or cylindrical recess 54, even more preferably a single axial or cylindrical recess 54 arranged approximately centrally in the angular sector 4, 6.

According to an embodiment, the filling material 16 occupies (or fills) at least partly (preferably completely or substantially completely) the plurality of axial or cylindrical recesses 54.

According to another embodiment, the plurality of axial or cylindrical recesses 54 does not have filling material 16.

According to a preferred embodiment, the type A geometry is as shown in FIG. 3, FIG. 5, FIG. 12 or FIG. 15, and the type B geometry is as shown in FIG. 4, FIG. 6, FIG. 13 or FIG. 16.

The present invention also relates to a method for manufacturing a rotor 1 according to any one of the embodiments shown above, or a rotor module 36 having the same features as said rotor 1.

In the present invention the expression "rotor module" indicates a rotor segment having an axial height smaller than the rotor and designed to be joined mechanically together with one or more other rotor modules so as to provide the rotor with a predefined axial length or height.

It follows that the features referring to the rotor 1 are also valid—mutatis mutandis—for the rotor module.

Said manufacturing method comprises the following steps:

(I) superimposing and joining together a plurality of cylinder plates, so as to provide a modular element 36 or a cylindrical body 2 which extends along a body axis X and which—in a plane perpendicular to the body axis X—delimits N adjacent angular sectors 4, 6, wherein each angular sector 4, 6 delimits axial or cylindrical cavities 8, 12, 14, 8', 12', 14' which have curvilinear cross-sections, where concave surfaces 18, 20, 22, 18', 20', 22' of said axial or cylindrical cavities 8, 12, 14, 8', 12', 14' are directed in the opposite direction to the body axis X;

(II) optionally pre-heating said modular element 36 or cylindrical body 2 of step (I) to a temperature of comprised from 50° C. to 120° C., preferably comprised from 60° C. to 100° C., and even more preferably comprised from 70° C. to 90° C.;

(III) filling at least partially (for example completely or substantially completely) the axial or cylindrical cavities 8, 12, 14, 8', 12', 14' of the cylindrical body 2 or of the modular element 36 of step (I) or of step (II) with a flowing precursor (for example a liquid or fluid precursor or a precursor in the form of a flowing powder) of said filling material 16;

(IV) solidifying said flowing precursor inside the axial or cylindrical cavities 8, 12, 14, 8', 12', 14' of the cylindrical body 2 or of the modular element 36 obtained from step (III) so as to provide said rotor 1 or a rotor module;

(V) preferably magnetizing said rotor 1 or rotor module obtained from step (IV).

Preferably, during the superimposition step (I), the plurality of cylinder plates is superimposed so as to align the axial or cylindrical cavities delimited by each plate, in such a way as to create the axial or cylindrical cavities of the cylindrical body.

Preferably, said filling step (III) following said step (I) or said step (II) comprises at least one moulding or injection-moulding step.

Preferably, the flowing precursor of step (III) has a temperature comprised from 45° C. to 350° C., preferably comprised from 50° C. to 100° C. for a precursor of the thermosetting polymer matrix, or comprised from 250° C. to 300° C. for a precursor of the thermoplastic polymer matrix.

Preferably, in the manufacturing method which uses a thermoplastic polymer matrix, said solidification step (IV) following the filling step (III) comprises a step involving cooling down to room temperature. Said cooling is more preferably performed in two stages: a first stage inside a mould until the flowing precursor of step (III) is sufficiently solidified so as not to flow out of the axial or cylindrical cavities, and a second stage outside the mould until room temperature is reached.

Preferably, in the manufacturing method where a thermosetting polymer matrix is used, said solidification stage (IV) following the filling step (III) comprises heating to a cross-linking or thermosetting temperature of said thermosetting polymer matrix.

Preferably, following the solidification step (IV), said method comprises a step (VI) of mechanically joining together two or more rotor modules obtained from step (IV)

or from step (IV) so as to provide said rotor 1 with a predefined axial length or height.

This embodiment may be useful in the cases where the rotor 1 has a long axial length and if there are narrow and long axial or cylindrical cavities. In this case, complete filling of said cavities could be difficult since—even if the optional preheating step (II) is performed—the precursor could solidify before filling the cavities in the desired manner (for example completely or substantially completely).

Preferably, during the mechanical joining step (VI), two or more rotor modules are connected by a common transmission shaft 44. Preferably, during step (VI), said transmission shaft 44 is inserted at least partly (for example completely) inside the axial holes 42 of two o more axially adjacent rotor modules, preferably by means of a prismatic connection or coupling system.

Preferably the magnetization step (V) follows the solidification which takes place in step (IV).

More preferably, when said method comprises a step (VI) of mechanically joining together two or more rotor modules, the magnetization step (V) is performed after or before, preferably before, the mechanical joining step (VI).

The present invention also relates to a synchronous electric machine 10 comprising said rotor 1 or comprising a rotor 1 or a rotor module obtained using said manufacturing method.

Said electric machine 10 is understood as being synchronous since the field of the stator 40 rotates in synchronism with the rotor 1.

Preferably, said synchronous electric machine 10 is selected from a synchronous reluctance motor, a three-phase synchronous reluctance motor, a synchronous reluctance machine different from a three-phase motor (with a number of stator phases other than three), a switched reluctance machine, a self-starting synchronous reluctance machine (in which the rotor 1 delimits further axial or cylindrical cavities for the insertion of one or more squirrel cages.

More preferably, said synchronous electric machine 10 is a synchronous reluctance motor.

Said synchronous reluctance motor comprises preferably a stator 40 which delimits a stator compartment 38 inside which said rotor 1 is housed rotatably about a rotation axis R1. The rotation axis R1 is preferably parallel to, more preferably coincides with, the body axis X. The rotor 1 is preferably connected to a transmission shaft 44.

Figures 9, 10, 11:
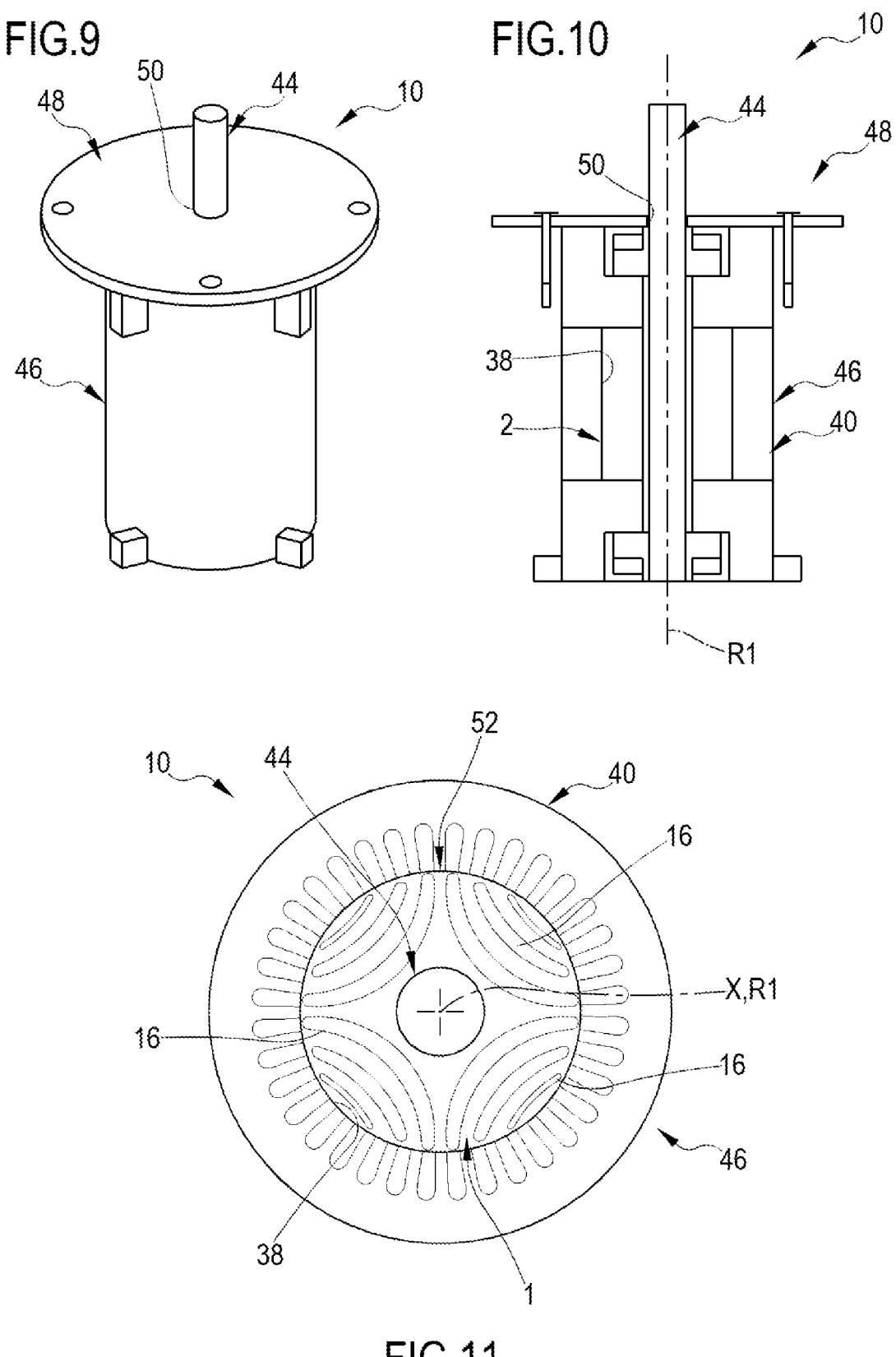
FIGS. 9, 10 and 11 show a perspective view, longitudinally sectioned view and cross-sectioned view, respectively, of a synchronous electric machine according to the present invention.
Figure 12:
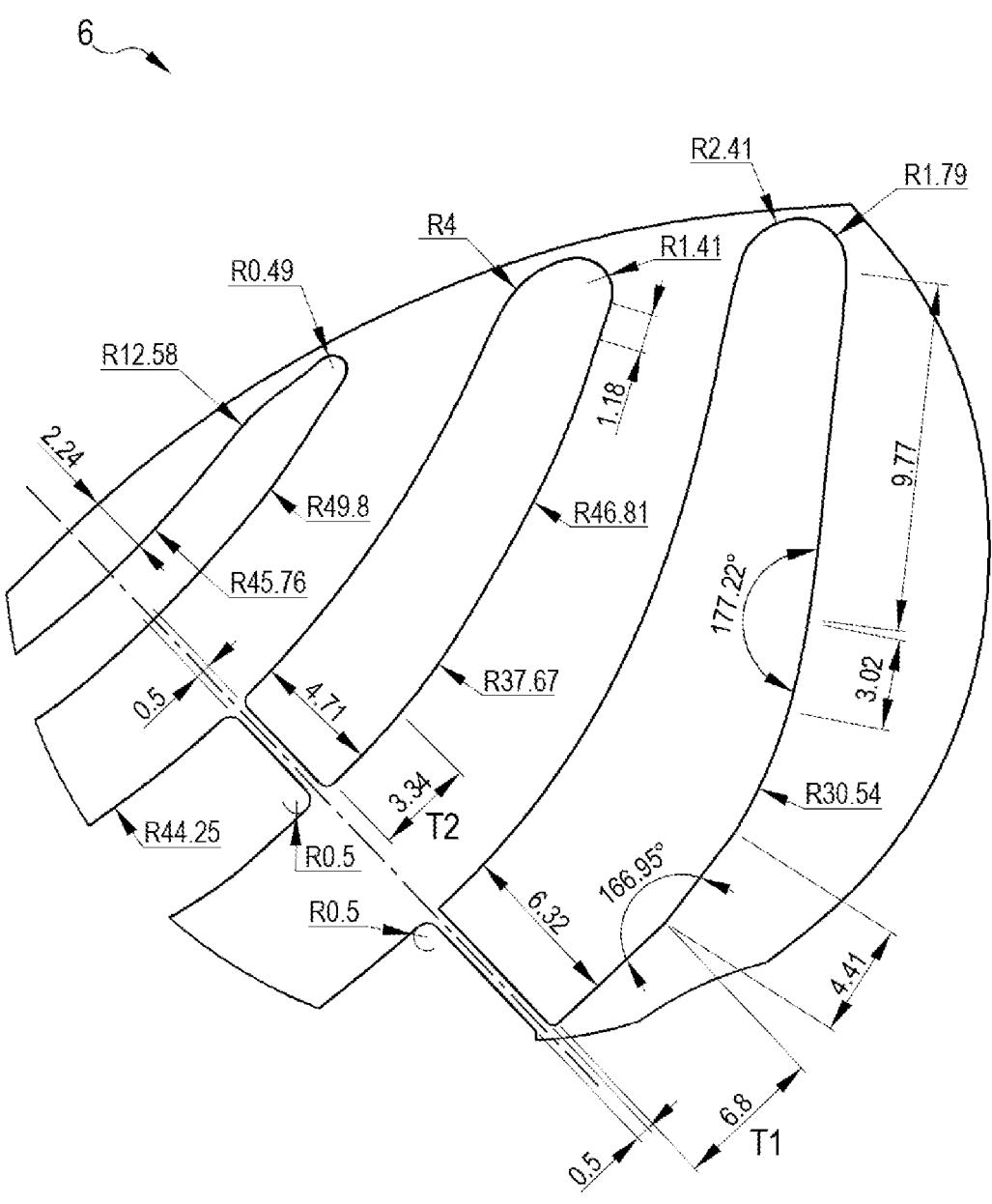
FIGS. 12 and 13 show a detail, on a larger scale, of the zones V and VI highlighted in FIG. 2, in accordance with further possible embodiments of a first angular sector and a second angular sector.
Figure 13:
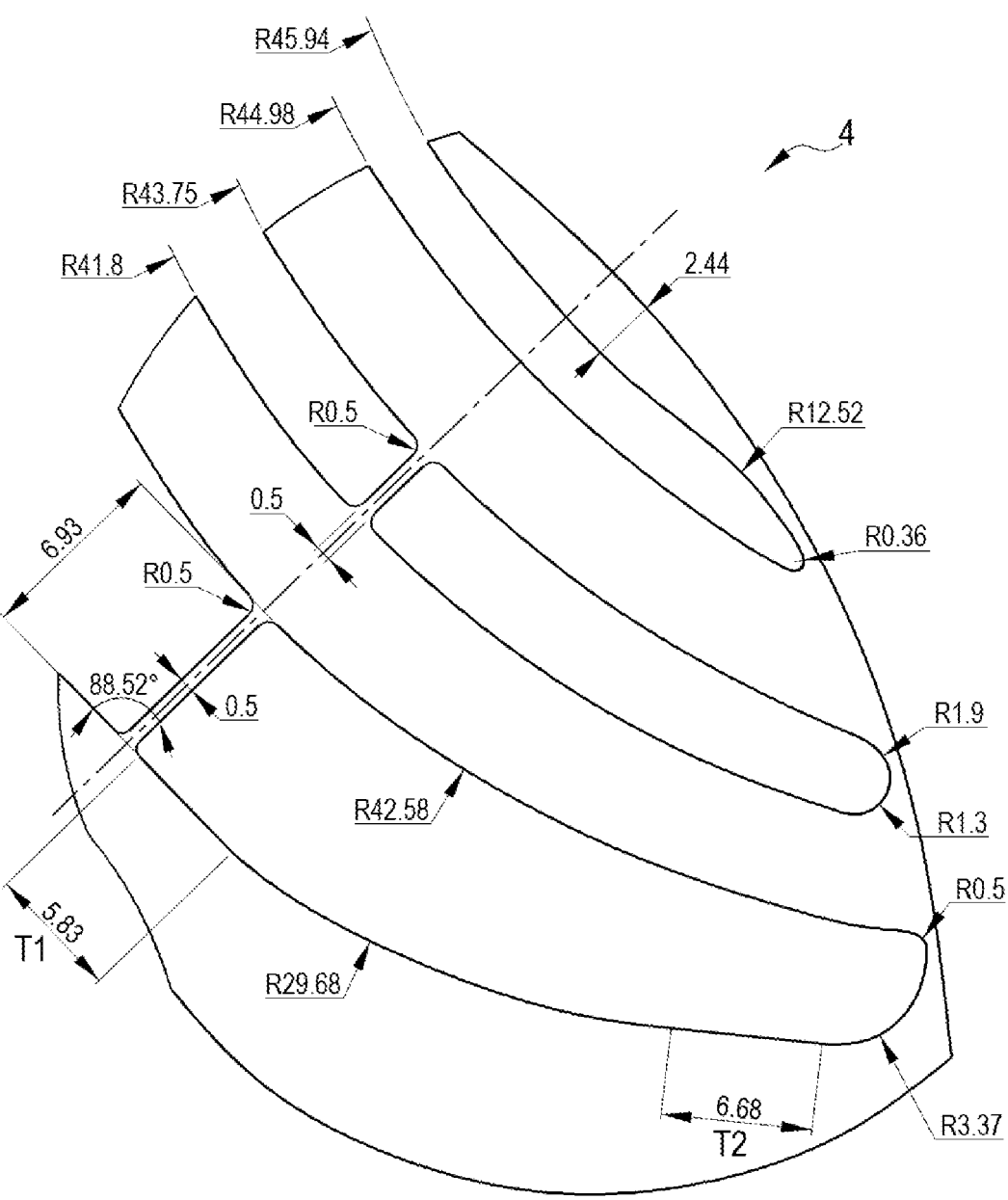

With reference to the embodiments according to FIGS. 9-11, the synchronous reluctance motor comprises a motor housing 46 accommodating at least partially (for example completely) the stator 40 and the rotor 1.

The motor housing 46 preferably comprises at least one housing flange 48 which delimits a through-opening 50 inside which the transmission shaft 46, rotationally locked to the rotor 1, is housed rotatably and projecting from said housing flange 48.

The stator 40 is preferably at least partially made of the same material as the rotor, more preferably a metal alloy, even more preferably an iron alloy, still more preferably a ferro-silicon alloy, for example M400-50A or M330-35A.

The transmission shaft 44 is preferably made of aluminium or a light aluminium alloy.

The motor housing 46 and the housing flange 48 are preferably made of metal, preferably aluminium, light aluminium alloy or carbon steel, more preferably aluminium or light aluminium alloy (owing to its heat conductivity).

Preferably, an air gap 52 between rotor and stator is comprised from 0.1 mm to 0.8 mm, preferably comprised from 0.2 mm to 0.6 mm, and even more preferably comprised from 0.4 mm to 0.5 mm.

An angular speed of the rotor 1 in said synchronous electric machine 10 is preferably comprised from 500 rpm to 20,000 rpm, preferably comprised from 700 rpm to 15,000 rpm, more preferably comprised from 1,000 rpm to 10,000 rpm, and even more preferably comprised from 1,200 rpm to 1,800 rpm, for example comprised from 1,300 rpm to 1,700 rpm.

The following Table 1 show examples of the operating parameters of the synchronous electric machine 10.

TABLE 1

| Parameter | Value |
|---|---|
| Power supply current of the stator | ≤9 A, for example 8.5 A |
| Power supply voltage | ≤120 V |
| Torque | 10 Nm |

The present invention also relates to an electric or hybrid vehicle comprising said synchronous electric machine 10.

According to an innovative aspect, the rotor according to the present invention allows a Pareto optimality to be obtained in relation to the following parameters:

(i) lower torque ripple; and (ii) higher mean torque value;

compared to the rotors of the prior art. In this way the rotor according to the invention has a more silent operating performance and generates less resonance.

It has in fact been calculated that, compared to conventional rotors in which there is no angular alternation of the geometries (rotors with only a type A geometry or with only type B geometry), the rotor according to the present invention is able to achieve a reduction of the torque ripple by about ⅔rds, all other operating conditions being equal.

Advantageously, owing to the presence of an "asymmetrical" rotor it is possible to double the number of modifiable independent parameters in order to achieve the aims of the present invention.

Advantageously the rotor according to the present invention is devoid of permanent magnets comprising rare earth elements so that it has a cost less than the rotors which use permanent magnets comprising this type of element.

Furthermore, this rotor is deliberately disassociated from possible future difficulties relating to the supply of rare earths.

Advantageously, the rotor according to the present invention has been designed to ensure a high torque, saliency, power factor and efficiency.

Advantageously, the rotor according to the present invention has magnetic flux barrier angles in the region of the axial or cylindrical cavities which are optimized.

Advantageously, the zone of the cylindrical body in the region of the dividing wall has been designed to be a magnetically saturated zone and therefore have a magnetic behaviour similar to air.

Advantageously the angles α, β—and in particular the difference between them—are among the main factors which help reduce the torque ripple.

In fact, without wishing necessarily to provide a scientific explanation of the phenomenon, the generation of torque at the air gap of a synchronous electric machine is explainable locally with the principle of minimization of the magnetic reluctance: the magnetic flux lines which cross the regions of the machine try to follow a path with the least reluctance, in accordance with the tendency of physical systems to reach the minimum energy state. The system therefore generates a force aimed at reaching this minimum energy state. The reluctance of the regions made of soft ferromagnetic material typically is between 100 and 10,000 less than air (this variability being due to non-linear saturation effects). In the region of the air gap, if there are stator recesses and rotor "false cavities" originating from the dividing wall, the flux lines undergo twisting with respect to the straight path so as to pass inside the ferromagnetic regions, with a lower reluctance despite the greater distance. This twisting action generates local torque which, in the case of a symmetrical configuration, is repeated n times along the rotor circumference and the effects of which are therefore added together. On the other hand, in the rotor according to the present invention, the presence of asymmetry result in torques which are not added together, but which even partially cancel out each other, with a consequent beneficial effect on the total torque ripple. This benefit can be easily measured, as for example shown in the diagram of FIG. 8.

Advantageously the manufacturing method according to the present invention allows the quantitative filling also of axial or cylindrical cavities with unfavourable geometric ratios.

Advantageously, in the rotor according to the present invention, the presence of the plurality of axial or cylindrical recesses may help increase the mean torque and reduce the torque ripple.

A person skilled in the art could, as required, replace or modify the characteristic features of the embodiments of the rotor, the manufacturing method, the synchronous electric machine and the vehicle described above. These embodiments are also to be regarded as included within the scope of protection formally defined by the claims below.

Moreover, it should be pointed out that any embodiment may be implemented independently of the other embodiments described.

LIST OF REFERENCE NUMBERS

1 rotor
2 cylindrical body
4 angular sector, in particular second angular sector
6 angular sector, in particular first angular sector
8 axial or cylindrical cavity, in particular proximal axial or cylindrical cavity
8' axial or cylindrical cavity, in particular proximal axial or cylindrical cavity
10 synchronous electric machine, preferably synchronous reluctance motor
12 axial or cylindrical cavity, in particular intermediate axial or cylindrical cavity
12' axial or cylindrical cavity, in particular intermediate axial or cylindrical cavity
14 axial or cylindrical cavity, in particular distal axial or cylindrical cavity
14' axial or cylindrical cavity, in particular distal axial or cylindrical cavity
16 filling material
18 concave surface
18' concave surface
20 concave surface
20' concave surface
22 concave surface
22' concave surface
24 radial bridge
26 radial bridge
28 convex surface 23
28' convex surface
30 convex surface
30' convex surface
32 convex surface
32' convex surface
34 outer circumference or outer cylindrical surface
36 modular element
38 stator compartment
40 stator
42 axial or cylindrical hole
44 transmission shaft
46 motor housing
48 housing flange
50 through-opening
52 air gap
54 axial recess or false cavity
56 dividing wall (barrier)
58 minimum thickness bridge
60 first cylinder or module base
62 second cylinder or module base
$\alpha$ angle circumscribed between radial plane R and mid-plane M
$\beta$ angle circumscribed between radial plane R and mid-plane M
C1 radius of curvature concave surface
C2 radius of curvature concave surface
C3 radius of curvature convex surface
C4 radius of curvature convex surface
D1 radial distance of the proximal axial or cylindrical cavities from the body axis
D2 radial distance of the intermediate axial or cylindrical cavities from the body axis
D3 radial distance of a convex surface from an outer circumference of the rotor
D4 radial distance of a convex surface from an outer circumference of the rotor
L1 length of the radial bridge
L2 width of the radial bridge
M mid-plane
P1 separation plane
P2 separation plane
P3 separation plane
R radial plane
T1 straight line along a concave surface
T2 straight line along a concave surface
X body axis
What is claimed is:

1. A rotor with N poles, wherein N is an even integer, wherein said rotor is devoid of permanent magnets comprising rare earth elements and comprises:
   a cylindrical body which extends along a body axis and which—in a plane perpendicular to the body axis—delimits N adjacent angular sectors;
   wherein each angular sector delimits cylindrical cavities which have curvilinear cross-sections, wherein concave surfaces of said cylindrical cavities are directed in the opposite direction to the body axis;
   wherein each of the N poles extends axially along the body axis from a first cylinder base to a second cylinder base, opposite to the first cylinder base, of the cylindrical body;
   a filling material which fills at least partly the cylindrical cavities and comprising or consisting of a polymer matrix;
   wherein at least one first angular sector delimits cylindrical cavities with a first geometry or type A geometry and wherein at least one second angular sector delimits cylindrical cavities with a second geometry or type B geometry, different from said first geometry, said first angular sector being arranged angularly alternating with said second angular sector,
   wherein the cylindrical cavities with the first geometry or type A geometry have internal volumes, forms and/or lengths of the outer perimeters and/or specific radial arrangements different from the cylindrical cavities with the second geometry or type B geometry, in particular the cylindrical cavities with the first geometry or type A geometry have a different width than the width of the corresponding cylindrical cavities with the second geometry or type B geometry, and the shape of the extremities of the cylindrical cavities with the first geometry or type A geometry is different from the shape of the extremities of the cylindrical cavities with the second geometry or type B geometry,
   wherein at least one of the cylindrical cavities is crossed by a radial mid-plane, wherein the cylindrical body is circumscribed by an outer cylindrical surface and wherein said cylindrical cavities are separated from the outer cylindrical surface by means of a dividing wall which has a variable thickness in a circumferential direction of the cylindrical body and a minimum thickness point, and
   wherein a radial plane includes the body axis and the minimum thickness point of a dividing wall, wherein said radial plane circumscribes an angle with said mid-plane, and wherein at least one of the cylindrical cavities delimited by the first angular sector is characterized by a first angle, wherein at least one corresponding cylindrical cavity delimited by the second angular sector is characterized by a second angle different from said first angle, and wherein the difference between said angles determines the first geometry or the second geometry of the cylindrical cavities.

2. The rotor according to claim 1, wherein the cylindrical body is formed by a plurality of cylinder plates, which are superimposed in the axial direction and joined together so that the polarities of each of the N poles of a cylinder plate correspond axially to the polarities of the N poles of an adjacent cylinder plate.

3. The rotor according to claim 1, wherein each cylindrical cavity circumscribes an internal volume, is delimited by an outer perimeter, and has a specific angular arrangement in the angular sector and wherein the cylindrical cavities delimited by the first angular sector have internal volumes, forms and/or lengths of the outer perimeters and specific radial arrangements different from those of the cylindrical cavities delimited by the second angular sector.

4. The rotor according to claim 1, wherein the cavities comprise a proximal cylindrical cavity, at least one intermediate cylindrical cavity and a distal cylindrical cavity spaced in a radial direction from the body axis, wherein the proximal cylindrical cavity and the at least one intermediate cylindrical cavity have a mirror-image symmetry with respect to radial bridges which centrally divide said proximal cylindrical cavities and said at least one intermediate cylindrical cavity;
   and wherein the cylindrical cavities delimited by the first angular sector have different:
   i—radial distances of the proximal cylindrical cavities and of the at least one intermediate cylindrical cavity from the body axis;

ii—radial distances of convex surfaces of said cylindrical cavities with respect to an outer cylindrical surface or circumference of said rotor;

iii—lengths and/or widths of the radial bridges; and iv—radii of curvature of one or more concave surfaces or of a part of said concave surfaces;

v—radii of curvature of one or more convex surfaces or of a part of said convex surfaces;

vi—optionally length, alternating arrangement and/or incidence of any straight sections located along one or more concave surfaces;

compared to the cylindrical cavities delimited by the second angular sector.

5. The rotor according to claim 1, wherein said filling material has:

a residual flow density or remanence—determined in accordance with DIN EN 60404-5—comprised from 150 mT to 450 mT;

a coercive field intensity or coercivity—determined in accordance with DIN EN 60404-5—comprised from 130 kA/m to 350 kA/m; and a maximum energy product—determined in accordance with DIN EN 60404-5—comprised from 10 kJ/m3 to 20 kJ/m3.

6. The rotor according to claim 1, wherein:

said polymer matrix is a thermoplastic matrix or a thermosetting matrix; and the filling material comprises one or more magnetizable or magnetized fillers embedded in said polymer matrix, wherein said magnetizable filler is selected from magnetite, ferrite, and mixtures thereof.

7. The rotor according to claim 1, wherein the polymer matrix is PA6 or PPS and said magnetizable filler is ferrite comprising exclusively strontium as metallic element.

8. The rotor according to claim 1, wherein the number N of poles is equal to four or equal to six.

* * * * *